United States Patent [19]
Suzuki et al.

[11] 3,863,731
[45] Feb. 4, 1975

[54] INSTRUMENT PANEL SUPPORTING CONSTRUCTION OF VEHICLES

[75] Inventors: Ichiro Suzuki, Toyota; Fumio Sugiura, Nisshin-cho, both of Japan

[73] Assignee: Toyota Jidosha Kogyo Kabushiki kaisha, Aichi-ken, Japan

[22] Filed: Aug. 23, 1973

[21] Appl. No.: 390,787

[30] Foreign Application Priority Data
Apr. 19, 1973 Japan................................ 48-44324

[52] U.S. Cl. ............................. 180/90, 280/150 B
[51] Int. Cl. ............................................ B60k 37/00
[58] Field of Search ......... 180/90; 280/150 B, 87 R; 74/492, 493

[56] References Cited
UNITED STATES PATENTS

| | | | |
|---|---|---|---|
| 3,341,248 | 9/1967 | Barenyl et al. | 180/90 X |
| 3,376,947 | 4/1968 | Barenyl et al. | 180/90 |
| 3,505,897 | 4/1970 | Scheffler et al. | 280/87 R X |

Primary Examiner—M. Henson Wood, Jr.
Assistant Examiner—Gene A. Church
Attorney, Agent, or Firm—Stevens, Davis, Miller & Mosher

[57] ABSTRACT

An instrument panel supporting construction of a vehicle in which instrument panel supporting members are assembled independently of supporting members for a steering column assembly to hold the instrument panel deformable and to mount the steering column firmly.

5 Claims, 4 Drawing Figures

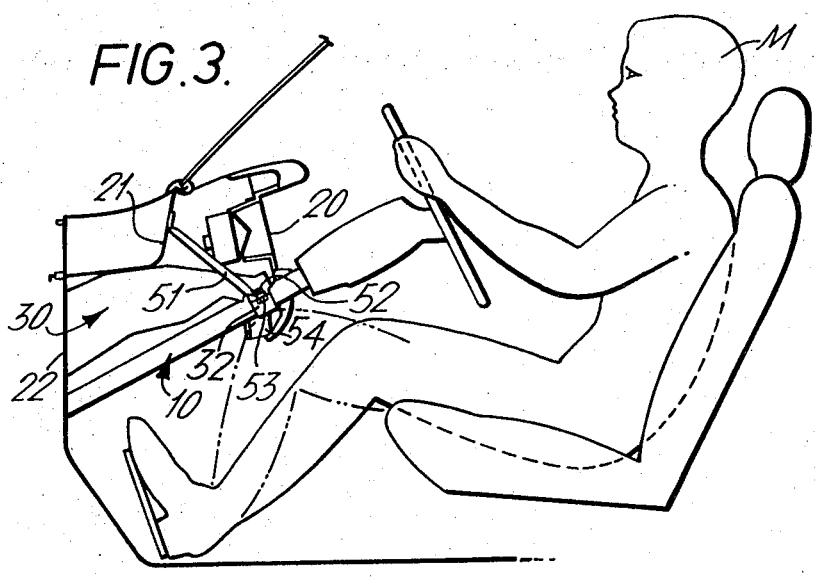
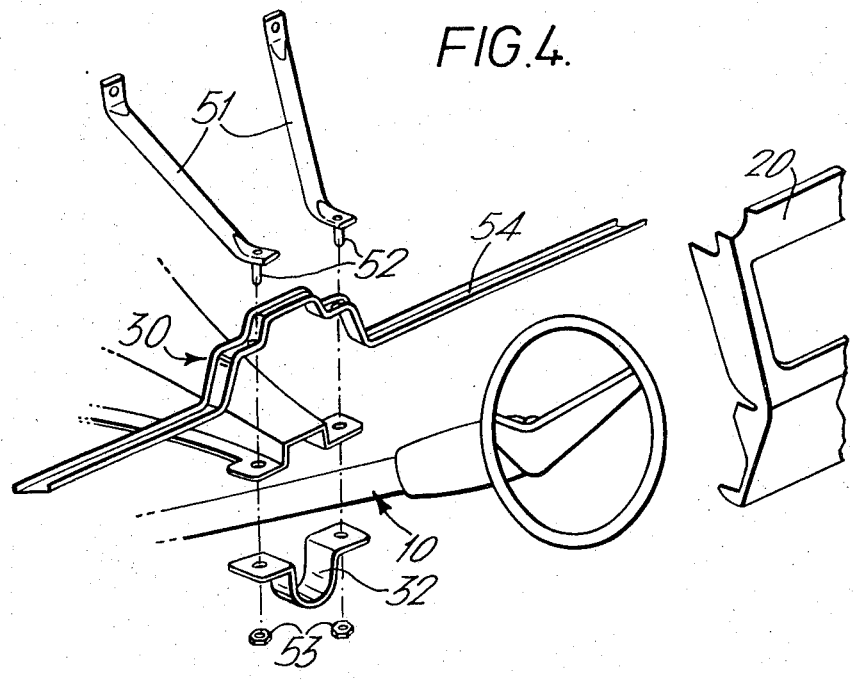

3,863,731

INSTRUMENT PANEL SUPPORTING CONSTRUCTION OF VEHICLES

BACKGROUND OF THE INVENTION

The present invention relates to an instrument panel supporting construction of a vehicle, more particularly to a construction suitable for a vehicle having a steering column assembly equipped with a conventional axially buckling impact energy absorbing device.

A conventional instrument panel supporting construction of a vehicle is designed to hold a steering column assembly of the vehicle firmly and integrally thereon. The supporting strength given by the integral construction as mentioned above may cause the operator to break his leg bones when he falls off forward and hits his legs onto the instrument panel in the event of an accidental collision of the vehicle. Furthermore, the deformation of the instrument panel by the said striking energy may displace the steering column assembly upwardly to disable or damage seriously the function of the provided impact energy absorbing device.

SUMMARY OF THE INVENTION

The prime object of the present invention is, therefore, to provide an instrument panel supporting construction for a vehicle, wherein instrument panel supporting means are assembled independently from supporting means for a steering column assembly to maintain the strength of the instrument panel at a proper level and yet to keep the provided impact energy absorbing device effective in the event of an accidental collision of the vehicle.

Another object of the present invention is to provide an instrument panel supporting construction for a vehicle, having the mentioned characteristics, wherein the stiffness of the instrument panel supporting means and of the instrument panel itself is predetermined to be such that the striking energy caused by the operator's legs can be absorbed.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 3 shows a view of a fragmentarily elevational cross-section of a conventional instrument panel supporting construction;

FIG. 4 is a schematic perspective view of the disassembled important parts of the construction shown in FIG. 3.

DESCRIPTION OF THE PREFERRED EMBODIMENT

Figure 1:
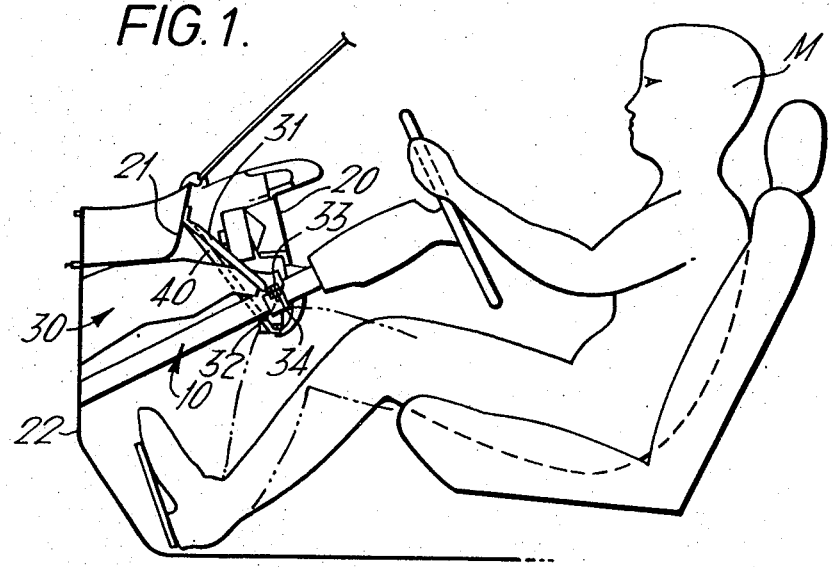
FIG. 1 shows a view of a fragmentarily elevational cross-section of an instrument panel supporting construction in accordance with the present invention.

A preferred embodiment of the present invention is described hereinafter with reference to the accompanying drawings. Now particularly referring to FIGS. 1 and 2, a steering column assembly 10 is provided with a well-known impact energy absorbing device of an axially buckling type and is held in the position therefor by way of a pedal bracket 30 fastened at its forward end on a dash panel 22 and a pair of steering column supporting struts 31, 31 of which the upper ends are secured on a cowl panel 21 of the vehicle body. The rear end of the pedal bracket 30 and the lower ends of the supporting struts 31, 31 are fastened together with a subsidiary bracket 32 by way of a pair of bolts 33, 33 and a pair of nuts 34, 34, the steering column assembly 10 being positioned between the pedal bracket 30 and the subsidiary bracket 32.

Figure 2:
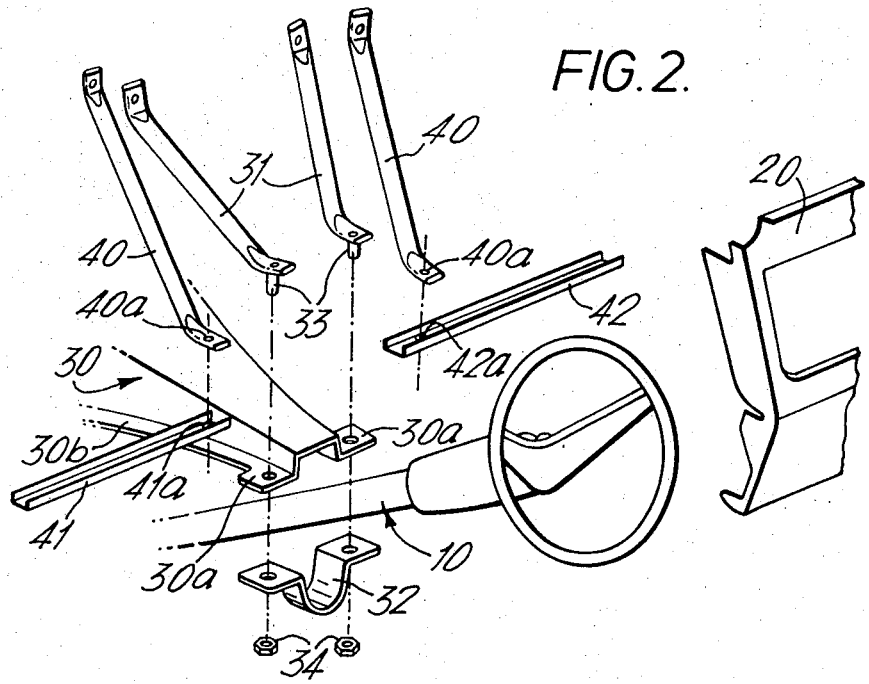
FIG. 2 is a schematic perspective view of the disassembled important parts of the supporting construction shown in FIG. 1.

As best shown in FIG. 2, the pedal bracket 30 has an up-side-down U-shaped cross-section and is provided with ribs 30b longitudinally along the both of left and right bottom edges thereof. The ribs 30b end with flanges 30a, 30a at the rear ends thereof. These flanges 30a, 30a are connected to the subsidiary bracket 32 to embrace an upper portion of the steering column 10. The steering column supporting struts 31, 31 are secured at the upper ends thereof on the front face of the cowl panel 21 and are fastened at their bottom ends on the upper sides of the flanges 30a, 30a of the pedal bracket 30 together with the subsidiary bracket 32 by clamping the bolts 33, 33 and the nuts 34, 34 to hang the steering column assembly 10 from the above.

An instrument panel 20 is mounted on the cowl panel 21 in a conventional way and the steering column assembly 10 passes transversely beneath the instrument panel 20. Reinforcement members 41 and 42 having U-shaped cross-sections transverse the steering column assembly 10. The reinforcement members 41 and 42 are seperately positioned at the left and right sides of the steering column assembly 10 and firmly secured at their outer ends on the lower portion of the instrument panel 20. The inner ends of the reinforcement members 41 and 42 are provided therethrough respectively with holes 41a and 42a to mount a pair of instrument panel supporting struts 40, 40. The upper ends of the instrument panel supporting struts 40, 40 are secured on the front face of the cowl panel 21 through the upper ends of the steering column supporting struts 31, 31. The lower ends of the instrument panel supporting struts 40, 40 are respectively provided with holes 40a, 40a which register with the holes 41a and 42a of the reinforcement members 41, 42. The reinforcement members 41 and 42 and the instrument panel supporting struts 40, 40 are fastened together by clamping bolts and nuts (not shown in the figures) at the holes 41a, 42a and 40a, 40a. Thus, the reinforcement members 41 and 42 are independently hung by the instrument panel supporting struts 40, 40 at the left and right sides of the steering column assembly 10. It is desirable that the instrument panel supporting struts 40, 40 are designed and formed to have strong resistance against pulling force and weak resistance against compressing force.

Disclosed in FIGS. 3 and 4 is a generally common embodiment of conventional instrument panel supporting constructions, wherein the same and/or similar reference numerals and characters are adopted for the same and/or similar parts and portions. The steering column assembly 10 is held in its position between the rear end of the pedal bracket 30 and the subsidiary bracket 32. The forward end of the pedal bracket 30 is firmly secured on the dash panel 22. A onepiece reinforcement member 54 is horizontally secured on the bottom face of the instrument panel 20. The reinforcement member 54 is formed in a shape corresponding to the rear end of the pedal bracket 30. Provided for this particular construction is a pair of supporting struts 51, 51 of which the upper ends are secured on the cowl panel 21. The lower ends of the struts 51, 51, the reinforcement member 54, the rear end of the pedal bracket 30 and the subsidiary bracket 32 are fastened together by means of a pair of bolts 52, 52 and a pair of nuts 53, 53 so that the steering column assembly 10 is firmly and integrally mounted on the bottom side of the instrument panel 20.

With the above-explained conventional construction, in the event of an accidental collision of the vehicle, the operator M may fall forward to strike his legs hard onto the bottom edge of the instrument panel 20 with resulting breakage of leg bones. Thus, striking energy may bend the reinforcement member 54 upward, which, in turn, push the steering column assembly 10 upward. Consequently, the steering column 10 stands up against the horizontal line only to disable or damage seriously the function of the conventional impact energy absorbing device equipped with the steering column assembly 10.

With the construction disclosed in the preferred embodiment of the present invention in respect with FIGS. 1 and 2, in the normal travel of the vehicle, loads acting on the steering column assembly 10 from every direction are transmitted to the cowl panel 21 by way of the steering column supporting struts 31, 31 and to the dash panel 22 through the pedal bracket 30. Thus, the desired holding strength for the steering column assembly 10 is well provided. Loads acting on the instrument panel 20 from every direction are transmitted directly to the cowl panel 21 indirectly through the instrument panel supporting struts 40, 40 so as to maintain the holding strength of the instrument panel 20.

In the event of an accidental collision of the vehicle, when the operator M may fall forward and strike hard the bottom edge of the instrument panel 20 with his legs, the instrument panel 20 may be deformed due to the weak stiffness of the struts 40, 40 against the compression force but does not affect the steering column assembly 10. In other words, the pedal bracket 30 and the steering column supporting struts 31, 31 for holding the steering column assembly 10 are secured on the vehicle body independently of the instrument panel supporting struts 40, 40 for hanging the instrument panel 20; the said deformation of the instrument panel 20 has no influence onto the pedal bracket 30 and the steering column supporting struts 31, 31. Thus, the steering column assembly 10 is maintained in its normal position so that the conventional impact energy absorbing device functions as designed to secure safety for the operator M. Furthermore, the legs of the operator M may be protected from bone-break as the deformation of the instrument panel 20 absorbs the striking energy.

Although the present invention has been illustrated and described in connection with a specific embodiment, various adoption and modifications will become apparent to those skilled in the art from the description in conjunction with the appended claims without departing from the scope and spirit of the present invention.

What is claimed is:

1. In an instrument panel supporting construction for a vehicle comprising first supporting means for hanging a portion of an instrument panel onto a cowl panel of the vehicle body, and second supporting means for supporting a steering column assembly of the vehicle on the vehicle body, the improvement wherein said first supporting means comprises a pair of struts for independently hanging the bottom portions of said instrument panel separated at the left and right sides of said steering column assembly from said cowl panel and said second supporting means comprises a first and a second supporting members for supporting said steering column assembly from said cowl panel and a dash panel of the vehicle body.

2. An instrument panel supporting construction as claimed in claim 1, wherein said instrument panel includes a pair of reinforcement members independently secured on said separated bottom portions thereof, said reinforcement members being fastened at the inner ends thereof on the lower ends of said struts which are secured at their upper ends on said cowl panel.

3. An instrument panel supporting construction as claimed in claim 1, wherein said struts are designed and made of such materials as to be strong against pulling force and weak against compression force.

4. An instrument panel supporting construction as claimed in claim 1, wherein said first supporting member of said second supporting means is a pair of struts of which the upper ends are secured on said cowl panel and the lower ends are secured on said second supporting member to connect said steering column assembly to said dash panel.

5. An instrument panel supporting construction as claimed in claim 4, wherein said second supporting member is a pedal bracket of which the forward end is secured on said dash panel and the rear end is fastened together with the lower ends of said struts and a subsidiary bracket for receiving said steering column assembly thereon.

* * * * *